United States Patent
Glessner et al.

(10) Patent No.: US 7,338,244 B2
(45) Date of Patent: Mar. 4, 2008

(54) ATTACHMENT DEVICE FOR TURBINE COMBUSTOR LINER

(75) Inventors: John Glessner, Oviedo, FL (US); Peter Tiemann, Witten (DE)

(73) Assignee: Siemens Power Generation, Inc., Orlando, FL (US)

(*) Notice: Subject to any disclaimer, the term of this patent is extended or adjusted under 35 U.S.C. 154(b) by 822 days.

(21) Appl. No.: 10/756,733

(22) Filed: Jan. 13, 2004

(65) Prior Publication Data

US 2005/0150233 A1 Jul. 14, 2005

(51) Int. Cl.
*F16B 23/00* (2006.01)
*F16B 21/00* (2006.01)

(52) U.S. Cl. .................. 411/401; 411/396; 411/349

(58) Field of Classification Search ........... 411/400, 411/401, 396, 553, 552, 549, 349
See application file for complete search history.

(56) References Cited

U.S. PATENT DOCUMENTS

| | | | |
|---|---|---|---|
| 126,366 A * | 4/1872 | Wills ................. 411/387.4 |
| 860,762 A * | 7/1907 | McGrady .................. 248/544 |
| 3,123,389 A * | 3/1964 | Biesecker ................. 292/218 |
| 3,437,119 A * | 4/1969 | Dey ............................ 411/349 |
| 3,500,639 A | 3/1970 | Stamm | |
| 3,811,154 A * | 5/1974 | Lindeman et al. ............ 24/326 |
| 4,117,928 A * | 10/1978 | Schenk ........................ 206/320 |
| 4,180,972 A | 1/1980 | Herman et al. | |
| 4,555,901 A | 12/1985 | Wakeman et al. | |
| 4,567,730 A | 2/1986 | Scott | |
| 4,614,082 A | 9/1986 | Sterman et al. | |
| 4,749,029 A | 6/1988 | Becker et al. | |
| 4,793,319 A * | 12/1988 | Vaughan et al. ............ 124/25.6 |
| 4,912,922 A | 4/1990 | Maclin | |
| 5,183,360 A * | 2/1993 | Freeman ....................... 411/400 |
| 5,291,732 A | 3/1994 | Halila | |
| 5,323,601 A | 6/1994 | Jarrell et al. | |
| 5,366,329 A * | 11/1994 | Burgess ....................... 411/368 |
| 5,371,994 A * | 12/1994 | Waters ........................ 52/749.1 |
| 5,701,733 A | 12/1997 | Lewis et al. | |
| 5,754,412 A * | 5/1998 | Clavin ........................... 361/804 |
| 6,279,313 B1 | 8/2001 | Lawen, Jr. et al. | |
| 6,453,675 B1 | 9/2002 | Royle | |
| 6,612,795 B2 * | 9/2003 | Kirchen ....................... 411/508 |
| 2001/0035003 A1 | 11/2001 | Sinha et al. | |
| 2003/0000223 A1 | 1/2003 | Conete et al. | |

FOREIGN PATENT DOCUMENTS

| CA | 1114623 | 12/1981 |
|---|---|---|
| DE | 1 400 852 | 3/1970 |
| WO | WO 92/04548 | 3/1992 |

* cited by examiner

*Primary Examiner*—Flemming Saether

(57) ABSTRACT

An attachment device for coupling one or more restrained members to a frame. In at least one embodiment, the attachment device may be configured to attach one or more turbine combustor liners to a carrier. The attachment device may include a body rotatable about an axis of rotation and including one or more arms for grasping an edge of at least one restrained member. A fastener may be coupled to the body for coupling the body to a frame. The attachment device may also include a retainer for preventing the fastener, which may be a threaded bolt, from becoming disengaged from the attachment device and traveling downstream in a turbine. An alignment device may be included for facilitating rotation of the body of the attachment device and engagement the arms with edges of restrained members. The alignment device may include an alignment indicator indicating a position of the arms.

16 Claims, 9 Drawing Sheets

ATTACHMENT DEVICE FOR TURBINE COMBUSTOR LINER

FIELD OF THE INVENTION

This invention is directed generally to retainers, and more particularly to retainers for coupling combustor liners in turbine engines.

BACKGROUND

Gas turbine combustors generally may be formed from annular combustors or can combustors. Annular combustors include a combustor chamber that is formed from a plurality of removable liners. These liners are exposed to extreme heat during operation, which sometimes causes distortions and failure in liners. Thus, the liners are replaced at regular intervals to prevent such failure from occurring during operation.

The liners are often removably coupled to a carrier, which forms the support structure of the combustor, using either spring slips or bolted configurations. Spring clips couple liners to each other or to the carrier of a combustor, or both. However, spring clips often suffer from relaxation and creep after being exposed to high temperatures commonly occurring in a combustor chamber, which can result in loss of clamp force in the clips. As a result, spring clips and liners can be liberated during operation of a combustor and cause substantial damage. To prevent damage, spring clips must be replaced frequently.

Combustor liners may also be coupled to a carrier using either a hot side bolted method or a cold side bolted method. The hot side bolted method includes bolting liners to a carrier by inserting bolts through orifices in a liner from the hot side of the combustor, which is the inner aspects of the combustor. Liners installed in this manner may be removed by personnel entering the inner aspects of the combustor through a manhole or other device and loosing the bolts attaching the liners to a carrier. While liners attached to a carrier in this manner may be removed easily, this method of attachment has disadvantages and risks. For instance, should the bolts loosen during operation, the bolts pose a threat of becoming disengaged with the carrier and traveling downstream into turbine blades. In addition, the bolts are exposed to hot gases in the combustor chamber and are required to be cooled and be made from expensive alloys. Air supplied from a compressor of the turbine combustor is often used to cool the bolts; however, use of air supplied by a compressor increases nitrous oxide emissions and degrades turbine combustor performance.

The cold side bolted method includes using bolts installed from the cold side of the combustor, which is outside surface of the combustor. The bolts are passed through the carrier and are received by the liners. Installing bolts in this method alleviates the possibility of bolts loosening and traveling downstream and alleviates the necessity to cool the bolts. However, a significant disadvantage of the cold bolted method is the amount of time needed to access the bolts to remove and replace the liners. The bolts may not be accessed from the inner aspects of the turbine combustor. Instead, the bolts are accessed only after the engine casing has been lifted, which is a process that may take hours or weeks.

Thus, a need exists for a more efficient system and method for releasably attaching combustor liners to carriers.

SUMMARY OF THE INVENTION

This invention relates to an attachment device for attaching one or more restrained members to a frame. In at least one embodiment, the attachment device may be used to couple one or more turbine combustor liners defining a turbine combustor to a carrier. The attachment device may be capable of coupling liners to a carrier from the hot side of the combustor without risk of the attachment device loosening and falling into the combustor cavity. The attachment device may be formed from a body rotatable about an axis of rotation. The body of the attachment device may have one or more cavities for receiving one or more fasteners. In one embodiment, the attachment device may include a cavity positioned along the axis of rotation and may include a fastener. The body may also be configured to fit into a cavity in a frame.

The attachment device may include one or more arms extending from the body grasping an edge of a restrained member to attach the retrained member to a frame. The arm may include a lip at an end of the arm for grasping an edge of a restrained member. The lip may include an opening sized to receive an edge of a restrained member. In one embodiment, the attachment device includes two arms extending from the body in opposite directions generally orthogonal to the axis of rotation of the body.

The attachment device may also include a retainer coupled to the body for preventing the fastener from becoming disengaged from the body while the fastener is not coupled to a frame. The retainer may be formed from any device capable of preventing the fastener from becoming disengaged from the body of the attachment device. In one embodiment, the retainer may be formed from a top flange and bottom flange forming a cavity sized and configured to contain a head of a fastener in a positioned so that the fastener may rotate and move a limited distance along the axis of rotation. The bottom flange may be formed as an integral part of the body or as a fitting. The fitting may be threadably coupled to the body of the attachment device. In another embodiment, a fastener may be retained with a bottom flange positioned between a head of a fastener and a flange coupled to a shaft of the fastener. The fastener can rotate and may move a limited distance in a direction that is generally parallel to the axis of rotation.

The attachment device may also include an alignment device for receiving an alignment tool to rotate the body to engage one or more arms with a restrained member. In one embodiment, the alignment device is formed from one or more keys coupled to an inside surface of the cavity in the body and corresponding keyways may be attached in the alignment tool, or vice versa. In at least one embodiment, the alignment device preferably allows the fastener to be tightened to a frame while the alignment tool remains coupled to the body. For instance, the alignment tool may also be formed from a generally hollow housing having a hexagonal cross-section.

The attachment device may also include a rotation limiting device for preventing the body of the attachment device from rotating about the axis of rotation after the fastener has been tightened. The rotation limiting device may be formed by configuring an outer surface of the body to prevent rotation of the body when the body is placed in a cavity in the frame. The cavity may have an inner surface shaped substantially similar to the outer surface of the body. The outer surface of the body may include one or more of the following: a flat surface, a protrusion, a slot, or other device.

The outer surface prevents the body from rotating by binding against the inside surface of the cavity if the body is slightly rotated.

The attachment device may be used to attach one or more restrained members to a frame, and in one embodiment, may be used to couple one or more turbine combustor liners to a carrier. The attachment device first be placed proximate to the carrier. The attachment device may be loosely coupled to the carrier. In one embodiment, two liners may be positioned around the attachment device and placed on the carrier so that an edge of the liners contacts, or is at least proximate to, the carrier. A tool be then be coupled to the alignment device to rotate the body of the attachment device until the arms contact the liners. Once the arms grasp the edges of the liners, the fastener may be tightened. In at least one embodiment, the fastener may be tightened by rotating the fastener. As the fastener is being tightened, the rotation limiting device is actuated, which prevents the body of the attachment device from rotating and releasing the liners. Once the fastener has been fully tightened, the liners are coupled to the carrier. The liners may be removed by loosing the fastener to a point where the rotation limiting device allows the body of the attachment device to rotate and release the edges of the liner from the grasp of the arms. These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
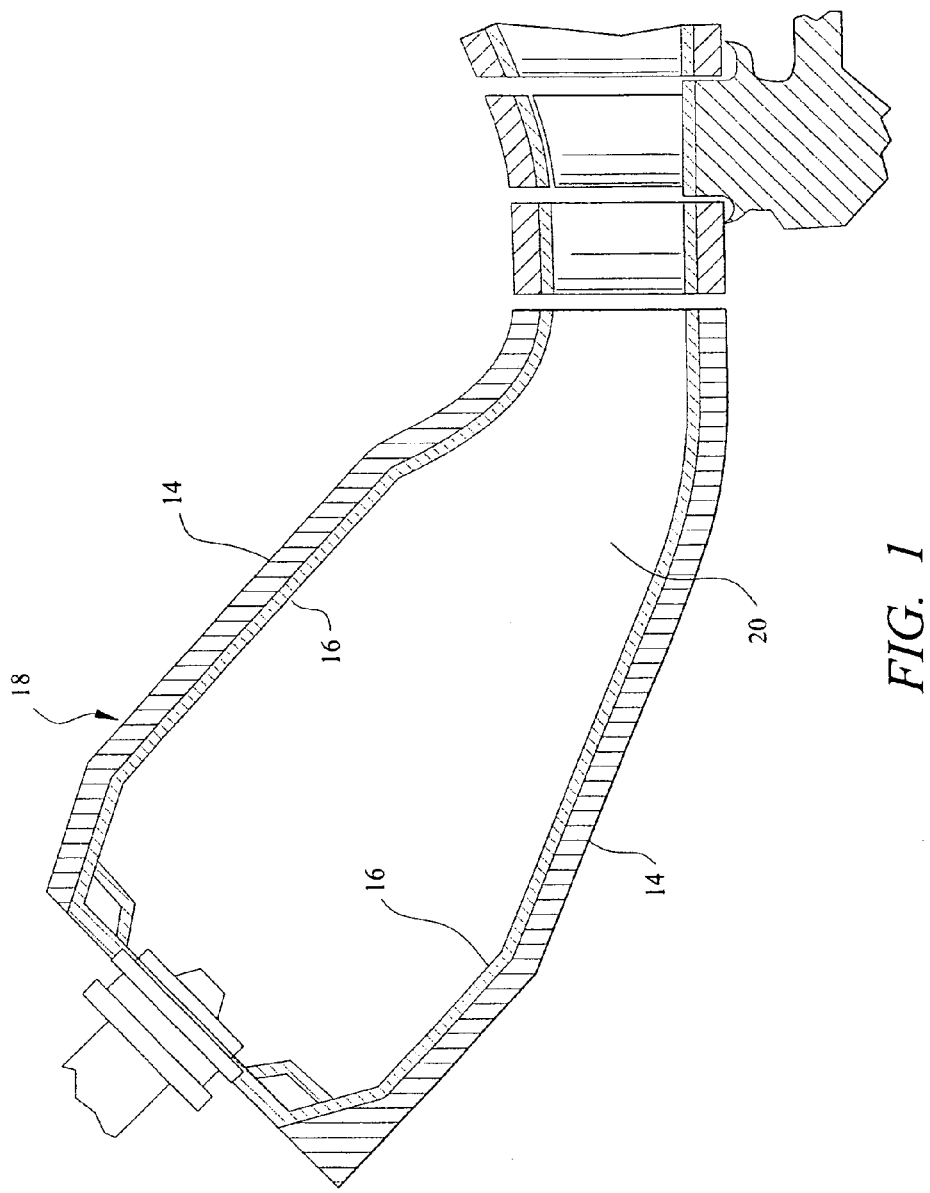
FIG. 1 is a cross-sectional view of an annular turbine combustor.

As shown in FIGS. 1-18, this invention is directed to an attachment device 10 for coupling one or more restrained members 12 to a frame 14. In at least one embodiment, as shown in FIG. 1, restrained member 12 may be one or more turbine combustor liners 16, and attachment device 10 may be configured to attach one or more turbine combustor liners 16 to a carrier 14 of a turbine combustor 18. Attachment device 10 may further be configured to allow for turbine combustor liners 16 to be removed from inner aspects 20 of a turbine combustor 18, which may also be referred to as the hot side of the turbine combustor. Attachment device 10, as shown in FIG. 2, may also use one or more fasteners 22 to couple restrained members 12 to frame 14, and may include a retainer 36 for preventing fastener 22 from becoming disengaged from the attachment device 10.

Figures 2, 3:
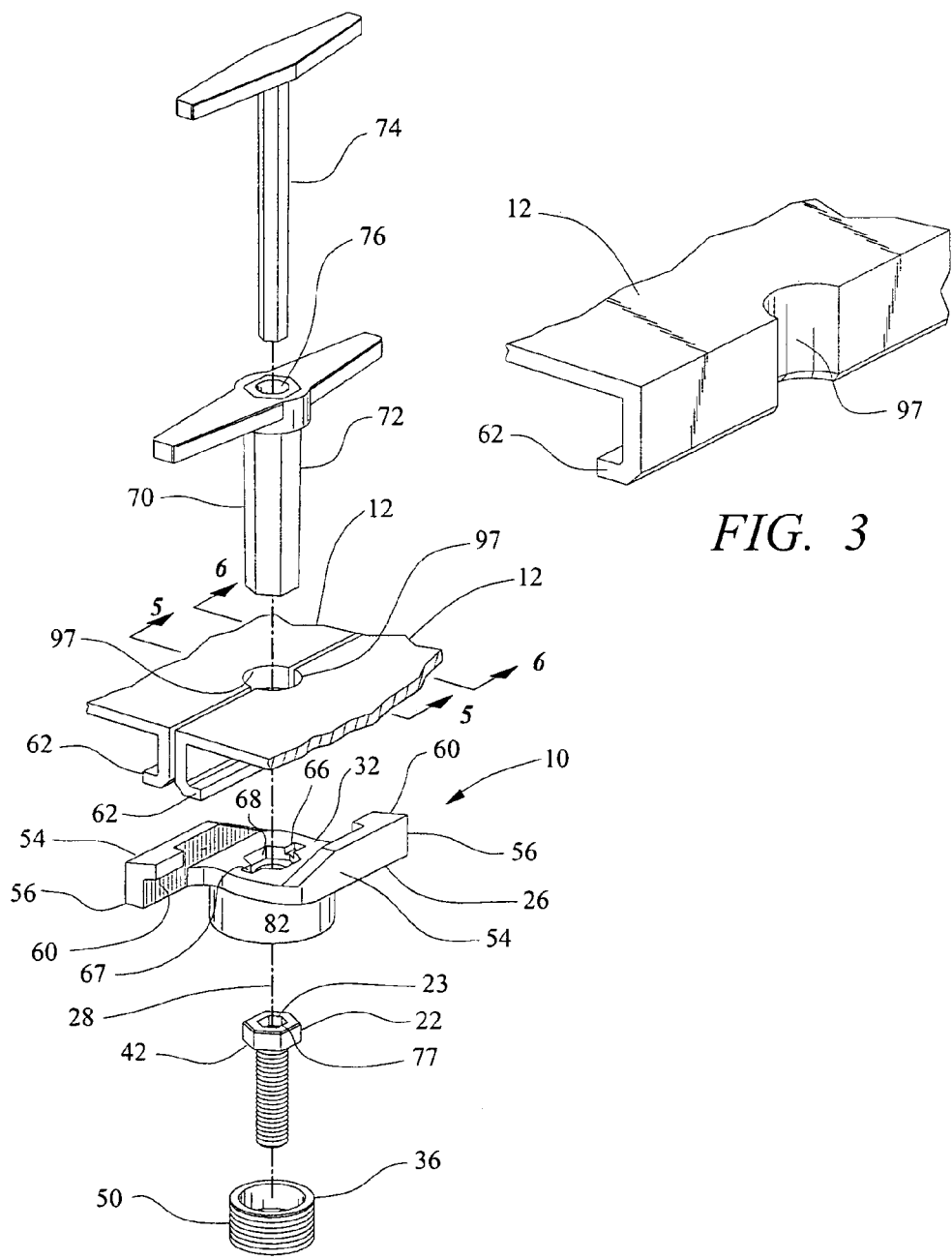
FIG. 2 is an exploded perspective view of an attachment device.
FIG. 3 is a perspective view of a portion of a restrained member.
Figure 4:
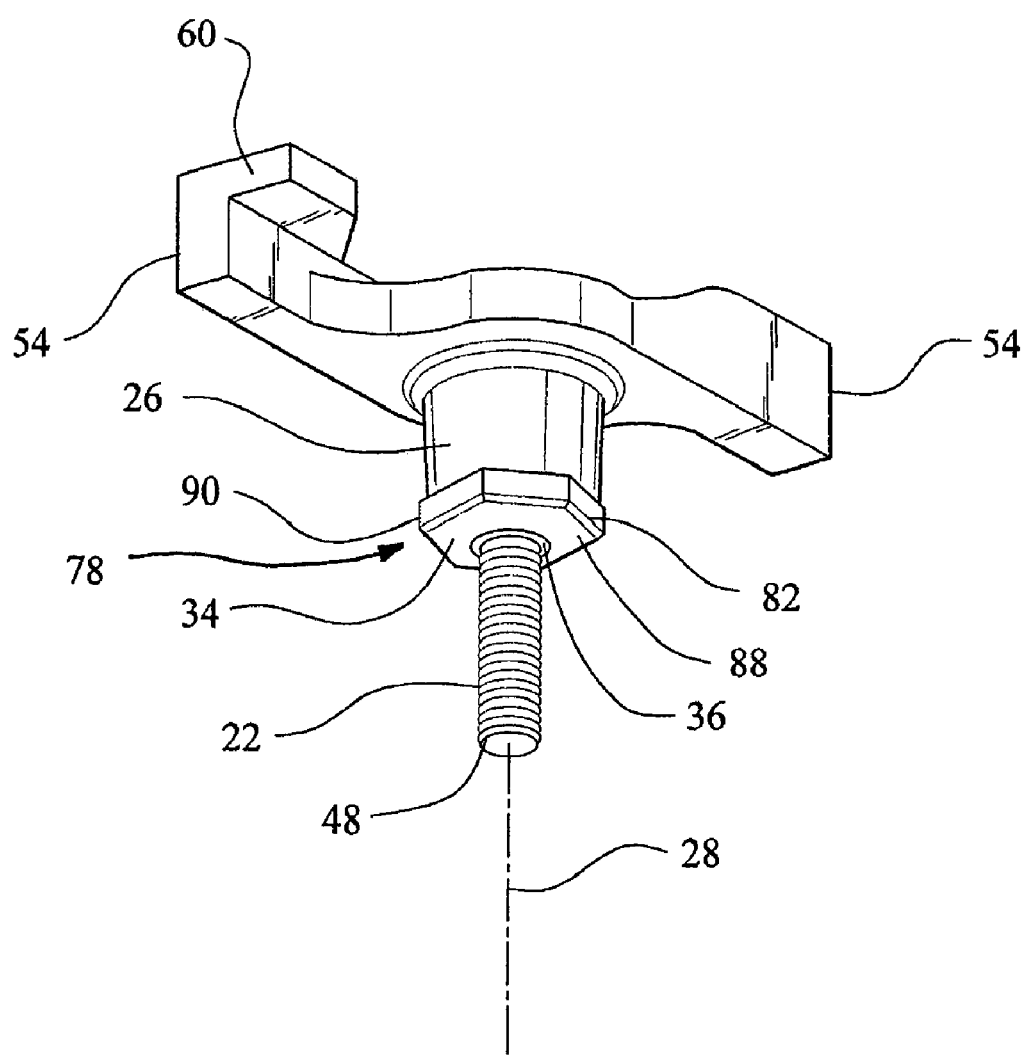
FIG. 4 is a bottom side perspective view of the attachment device having two arms for attaching two restrained members to a frame.
Figure 5:
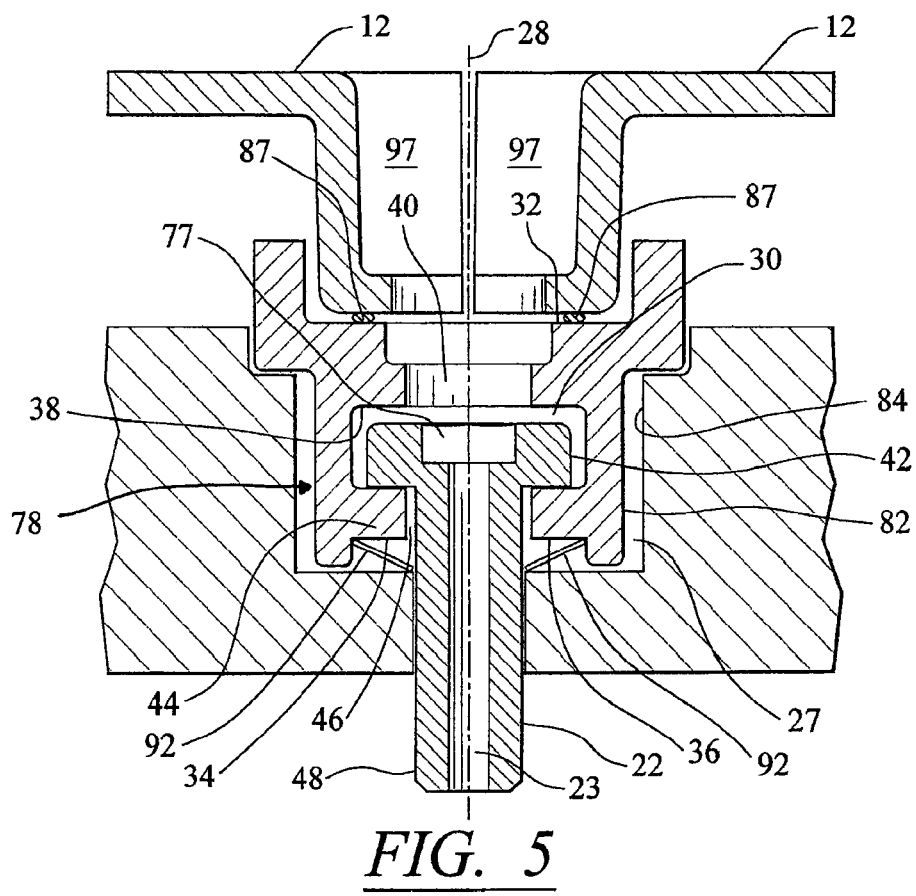
FIG. 5 is a cross-sectional view of the attachment device taken at section line 5-5 in FIG. 2.

As shown in FIGS. 2, 4, and 5, attachment device 10 may be formed from a body 26. Body 26 may be rotatable about an axis of rotation 28. Body 26 may be configured to fit in a cavity 27 of frame 14, as shown in FIG. 5. Body 26 may include an uppermost surface 32 configured to fit closely with cavity 27 to prevent, or substantially prevent, cooling gases from leaking between body 26 and cavity 27. Body 26 may be formed from one or more pieces. In one embodiment, body 26 may be formed from two or more pieces that may be welded together. In yet another embodiment, body 26 may be formed from a single piece. Body 26 may be formed from materials, such as, but not limited to: aluminum; steel, such as stainless steel; titanium; nickel; nickle alloys; nickel based superalloys; and the like.

As shown in FIG. 5, body 26 may also include one or more cavities 30 for containing fastener 22. Cavity 30 may extend from an uppermost surface 32 to a lowermost surface 34 of body 26. In at least one embodiment, body 26 includes a cavity 30 positioned along axis of rotation 28. Cavity 30 may also be sized appropriately to allow fastener 22 to rotate about axis of rotation 28 while the fastener is positioned in the cavity and to allow body 26 to rotate about the axis of rotation.

Body 26 may also include one or more fasteners 22, as shown in FIGS. 2, 4 and 5. As shown in FIG. 5, fastener 22 may be sized to fit in cavity 30 and to engage frame 14. Fastener 22 may be any releasable connector having sufficient strength to couple restrained member 12 to frame 14 and to resist deformation or failure, or both, as a result of the high temperatures found in inner aspects 20 of turbine combustor 18. In at least one embodiment, as shown in FIG. 4, fastener 22 may be one or more threaded bolts. As shown in FIGS. 2 and 5, fastener 22 may include one or more orifices 23, for allowing a cooling fluid, such as air, to flow through fastener 22 to cool portions of the fastener and body 26 exposed to hot gases in inner aspects 20 of turbine combustor 18. In one embodiment, fastener 22 may be positioned along the axis of rotation 28 of the body, as shown in FIGS. 4 and 5. In another embodiment, attachment device 10 may include two or more fasteners 22 positioned in body 26, but not positioned along axis of rotation 28 (not shown).

Attachment device 10 may include a retainer 36, as shown in FIGS. 2 and 5, for preventing fastener 22 from becoming disengaged from body 26. Thus, if fastener 22 becomes disengaged from frame 14 during use, retainer 36 prevents the fastener from becoming disengaged from attachment device 10 and traveling downstream where the fastener could cause substantial damage to the turbine. Retainer 36 may permit fastener 22 to move relative to body 26. For instance, in embodiments where fastener 22 is a threaded bolt, as shown for instance in FIGS. 2 and 5, retainer 36 may permit fastener 22 to rotate relative to body 26 and to move along axis of rotation 28 a limited distance. In particular, retainer 36, as shown in FIG. 5, may be formed from a top flange 38 coupled to body 26 or integrally formed in the body. Top flange 38 may have an orifice 40 for receiving at least one tool for rotating fastener 22. Preferably, orifice 40 in top flange 38 is configured to prevent fastener 22 from passing through the orifice. Orifice 40 may have a diameter that is smaller than a diameter of a head 42 of fastener 22.

Retainer 36 may also be formed from a bottom flange 44, as shown in FIG. 5. Bottom flange 44 may include an orifice 46 for holding a shaft 48 of a fastener 22. Preferably, orifice 46 of bottom flange 42 may be configured to prevent head 42 from passing through the orifice. In one embodiment, orifice 46 may have a diameter that is greater than a diameter of shaft 48, but less than a diameter of head 42 of fastener 22. In one embodiment, bottom flange 44 may be integrally formed with body 26.

Figure 13:
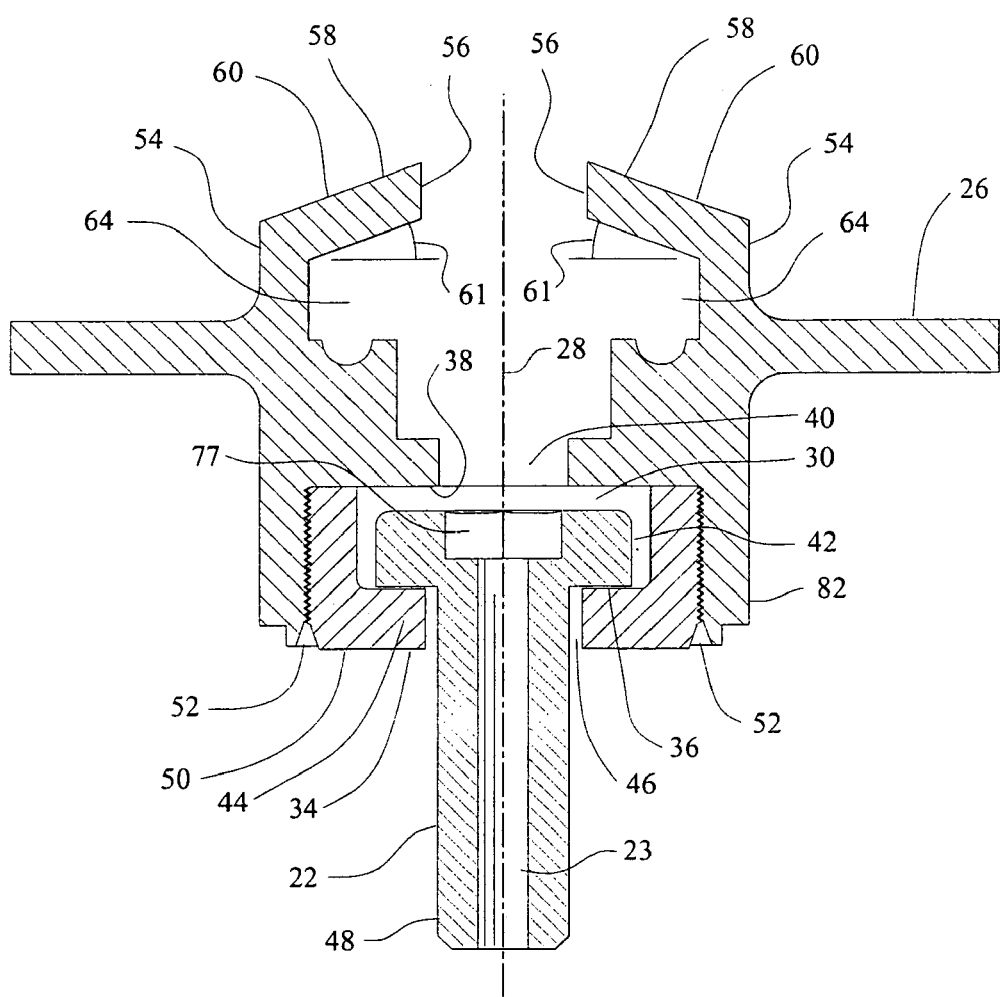
FIG. 13 is a cross-sectional side view of an alternative embodiment of the attachment device.

In one embodiment, bottom flange 44 may be a fitting 50, as shown in FIGS. 2 and 13. Fitting 50 may be coupled to body 26 to prevent fastener 22 from being disengaged from body 26. In one embodiment as shown in FIGS. 2 and 13, fitting 50 may be threadably coupled to body 26. One or more welds 52, as shown in FIG. 13, may be used to prevent fitting 50 from becoming loose and possible disengaging from body 26, thereby enabling fastener 22 to become disengaged from body 26.

Figure 7:
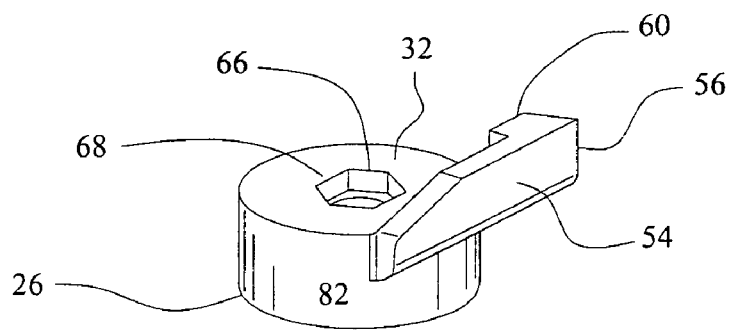
FIG. 7 is a perspective view of an alternative embodiment of the device of FIG. 2 having one arm for attaching two restrained members to a frame.
Figure 11:
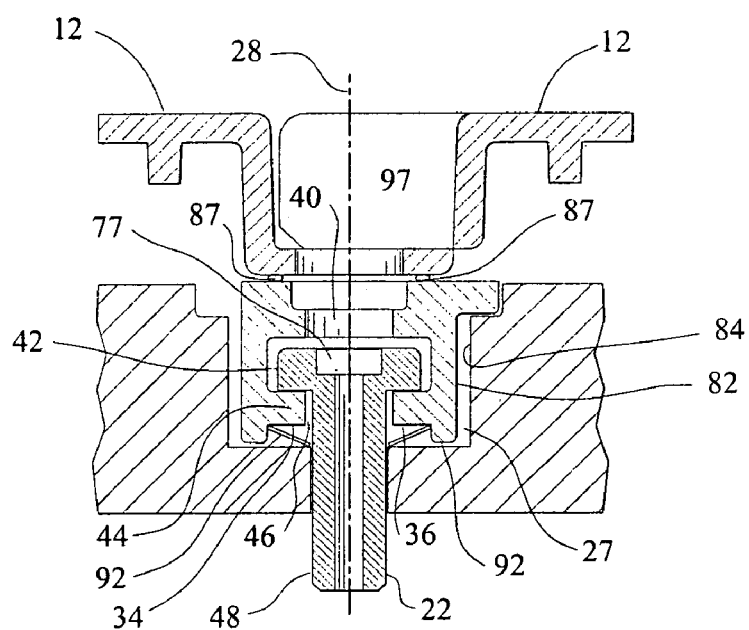
FIG. 11 is a cross-sectional view of an alternative embodiment of the attachment device taken along section lines 11-11 in FIG. 8.

Attachment device 10 may include one or more arms 54 extending from body 26, as shown in FIGS. 2, 4, 5, 7, 11, and 13-17, and configured to grasp an edge 62 of a restrained member after body 26 has been rotated about axis of rotation 28. FIGS. 7 and 11 shows an embodiment of attachment device 10 having one arm 54 capable of grasping at least two restrained members 12, and FIGS. 2, 4, 5, and 13-17 shows an embodiment of the attachment device having two arms 54. In at least one embodiment, arm 54 may extend generally orthogonal to axis of rotation 28. An end 56 of arm 54 may be configured to grasp restrained member 12. In one embodiment, end 56 may have a lip 60 for grasping a restrained member. Lip 60 may be positioned generally orthogonal to axis of rotation 28. In one embodiment, as shown in FIG. 13, at least a portion of lip 60 may be positioned at an acute angle 61, such as between about one degree and about 45 degrees, relative to a line generally orthogonal to axis of rotation 28. Positioning lip 60 in this manner facilitates engaging restrained member 12, especially when edge 62 is distorted and is not flush with frame 14. End 56 is not limited to these configurations, rather the end 56 may be configured in any manner capable of engaging restrained member 12 and holding the restrained member 12 against frame 14.

In one embodiment as shown in FIGS. 2 and 4, attachment device 10 may include at least two arms 54. The arms may extend from body 26 in generally opposite directions. Ends 56 of arms 54 may be configured to grasp restrained member 12 as attachment device 10 is rotated about axis of rotation 28. Arms 54 may include openings 64 for receiving portions of restrained members 12. Openings 64 in lip 60 may be positioned generally orthogonal to a line extending radially from and generally orthogonal to axis of rotation 28. Openings 64 may also face in generally opposite directions (not shown). The direction in which openings 64 are shown in FIGS. 2 and 4 may both be reversed in an alternative embodiment.

Attachment device 10 may also include an alignment device 66, as shown in FIG. 2, for rotating attachment device 10 so that end 56 of arm 54 contacts restrained member 12. Alignment device 66 may be any device capable of engaging attachment device 10 and rotating body 26. Alignment device 66 may include an alignment indicator 67 for determining the position of the arm 54. Alignment device 66 may include a key and keyway configuration. One or more keyways 68 may be placed on the inside surfaces of cavity 30 and one or more keys 70 may be included on an alignment tool 72 corresponding to keyways 68, or vice versa. In one embodiment, alignment device 66 may be hollow and may have a hexagonal cross-section. Alignment tool 72 may also have an outer surface having a hexagonal cross-section or may have other cross-sections. Preferably, alignment tool 72 enables fastener 22 to be rotated using a rotation tool 74 while alignment tool 72 remains attached to attachment device 10. In one embodiment, as shown in FIG. 2, alignment tool 72 includes at least one orifice 76 for allowing rotation tool 74 to access fastener 22 while the alignment tool remains attached to body 26. Alignment tool 72 may have a semicircular or other shape not interfering with fastener 22.

In the embodiment where fastener 22 is a threaded bolt, as shown in FIGS. 2 and 5, fastener 22 may include head 42 containing a socket 77 for receiving rotation tool 74 for rotating fastener 22 relative to body 26. Socket 77 preferably is smaller than orifice 40 in top flange 38 so that rotation tool 74 may be inserted into socket 77. Socket 77 may have any configuration enabling fastener 22 to be rotated using rotation tool 74. For instance, and not by way of limitation, socket 77 may have three or more side walls that may form a cross-section having the following shapes: triangular, rectangular, square, star shaped, hexagonal and others.

Attachment device 10 may also include a rotation limiting device 78, as shown in FIGS. 4 and 5, for preventing body 26 from rotating about axis of rotation 28 once arm 54 is engaged with restrained member 12 and fastener 22 tightened. In one embodiment, rotation limiting device 78 prevents body 12 from rotating once body 12 has been positioned at least partially in cavity 27 in frame 14. Rotation limiting device 78 may be formed from an outer surface 82 of body 26 configured to prevent rotation of the body about axis of rotation 28. Outer surface 82 may include one or more substantially flat surfaces configured to fit closely with an inner surface 84 of cavity 27 formed in frame 14. In other words, inner surface 84 of cavity 27 may be shaped substantially similar to outer surface 82 of body 26. Inner surface 84 may include a flat surface, protrusion, or other device capable of fitting closely with outer surface 82 and preventing body 26 from rotating. Outer surface 82 may also include one or more protrusions configured to mate with slots in inner surface 84, or vice versa. Lowermost surface 34 may also include one or more protrusions for preventing rotation of the body 26 about axis of rotation 28.

In yet another embodiment, as shown in FIG. 4, rotation limiting device 78 may be formed from a fitting 88 coupled to a bottom surface 90 of body 26. Fitting 88 may have any exterior shape capable of preventing body 26 from rotating, such as those shapes described above for outer surface 82 of body 26. For instance, fitting 88 may have one or more substantially flat exterior surfaces, such as, but not limited to a hexagonal shaped cross-section.

Attachment device 10 may also include one or more biasing devices 92 for biasing body 26 to an open position, as shown in FIGS. 5 and 11. In one embodiment, biasing device 92 may be one or more springs positioned between bottom surface 34 of body 26 and inner surface 84 of cavity 27. Biasing body 26 to an open position insures that opening 64 of lip 60 is capable of receiving edge 62 of restrained member 12. This configuration is often necessary where edge 62 has been warped due to heat and does not rest flush against frame 14 without a force being applied to edge 62.

Figure 6:
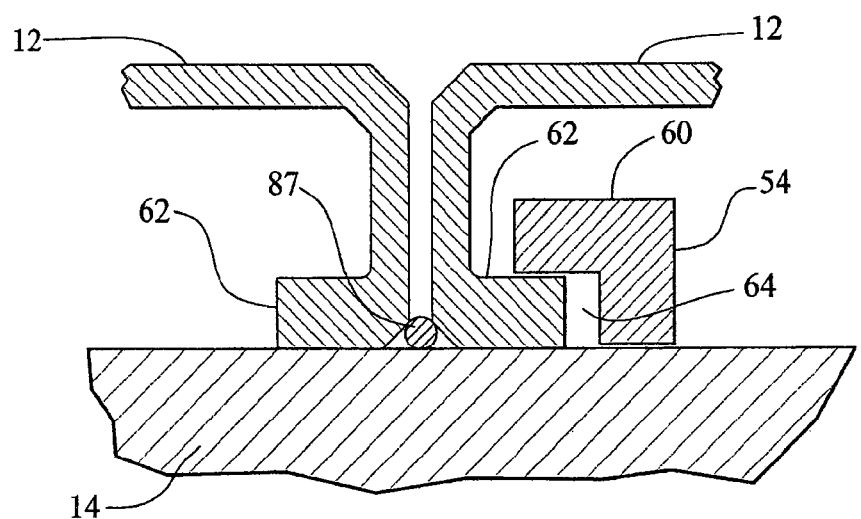
FIG. 6 is a cross-sectional view of the attachment device taken at section line 6-6 in FIG. 2.

Attachment device 10 may include one or more seals 87 for sealing restrained members 12 to frame 14. As shown in FIGS. 5 and 11, seals 87 may be placed on one or both sides of orifice 40 between uppermost surface 32 and restrained members 12. As shown in FIG. 6, a single seal may be used to seal adjacent restrained members 12 to frame 14.

Figure 8:
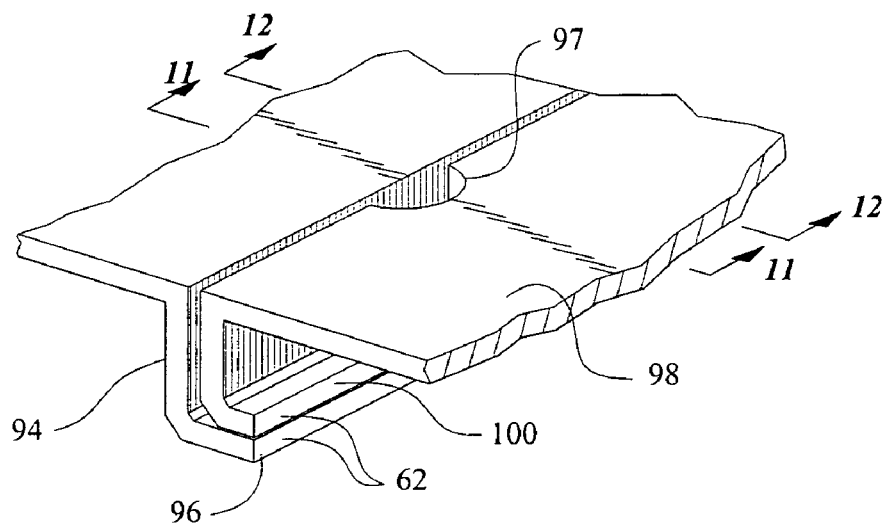
FIG. 8 is a perspective view of two restrained members coupled together using the device shown in FIG. 7.
Figure 9:
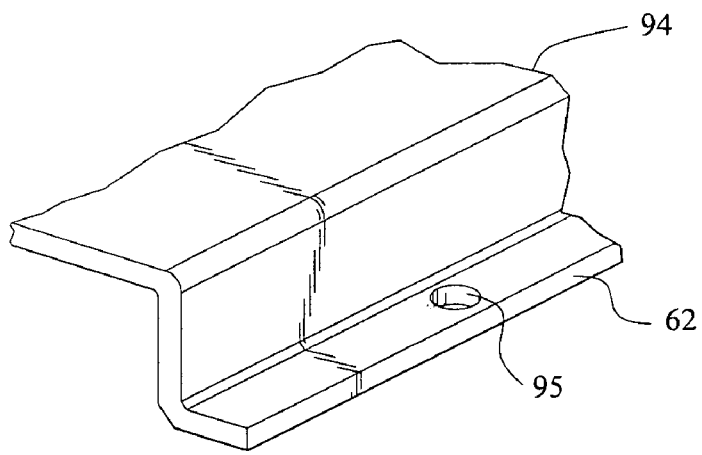
FIG. 9 is a perspective view of a restrained member usable with the attachment device shown in FIG. 7.
Figure 10:
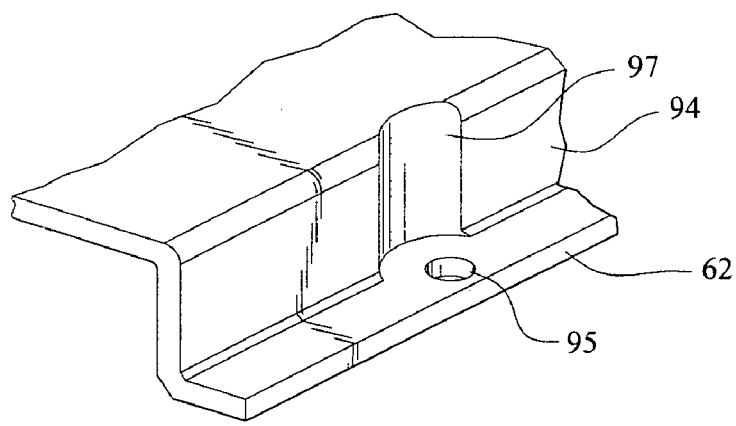
FIG. 10 is a perspective view of an alternative embodiment of a restrained member.
Figure 12:
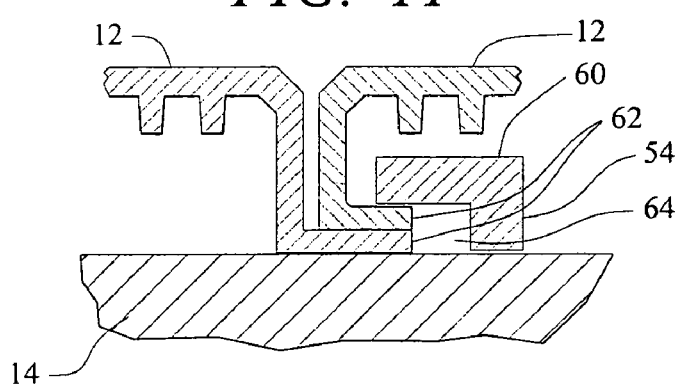
FIG. 12 is a cross-sectional view of an alternative embodiment of the attachment device taken along section lines 12-12 in FIG. 8.

Attachment device 10 may be used to attach a restrained member 12 to a frame 14. In at least one embodiment, as shown in FIG. 7, attachment device may use a single arm 54 to attach at least two retrained members 12, which may be turbine combustor liners, to a frame, which may be a carrier 14. In this embodiment, restrained members 12 may be configured so that edges 62 of each restrained member mesh together and provide lip 60 with a surface to which lip 60 may grasp. In particular, restrained member 94, as shown in FIGS. 8 and 12, may include have an edge 96 that extends substantially away from restrained member 94 while restrained member 98 includes edge 100 extending towards restrained member 98. In this configuration, edges 96 and 100 can nest to provide a single edge for arm 54 to grasp. As shown in FIG. 9, restrained member 94 usable with single arm 54 may include an orifice 95 for receiving an alignment tool 72. In yet another embodiment usable with single arm 54, as shown in FIG. 10, restrained member 12 may include an orifice 95 for receiving an alignment tool 72 and an indentation 97 for receiving an alignment tool 72. Indentation 97 may be positioned either one of adjacent restrained members 12, as shown in FIGS. 8 and 10, or in both adjacent restrained member 12, as shown in FIGS. 2, 5, and 11. Edge 62 of restrained member 12 may extend toward an adjacent restrained member, as shown in FIGS. 8, 9, and 10.

In other embodiments, as shown in FIGS. 2, 4, 5, and 13-17, attachment device 10 may use two arms 54 to attach two restrained members 12 to frame 14. Restrained members 12 may each include edges 62 configured to provide lip 60 with surfaces to grasp. As shown in FIG. 3, edges 62 of restrained member 12 extends generally away from an adjacent restrained member 12.

Figure 14:
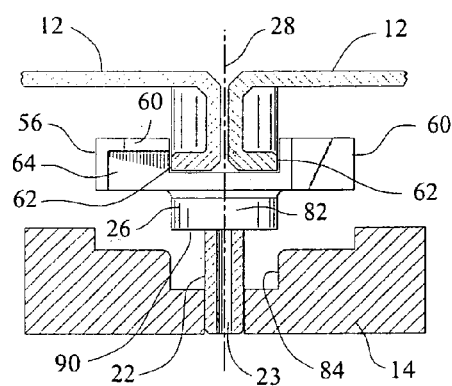
FIG. 14 is a cross-sectional view of the attachment device with arms in an open position and restrained members in contact with the attachment device.
Figure 15:
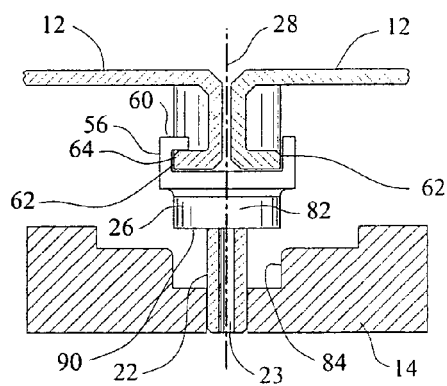
FIG. 15 is a cross-sectional view of the attachment device with arms engaged to restrained members.
Figure 16:
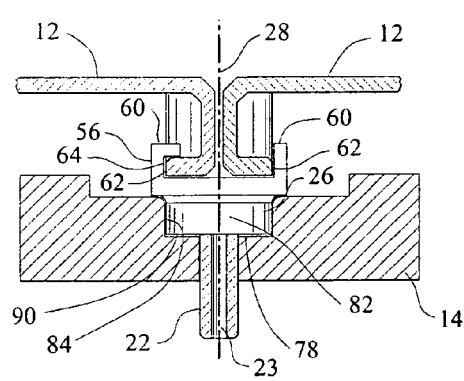
FIG. 16 is a cross-sectional view of the attachment device with arms engaged to restrained members and a fastener tightened to frame.

Attaching the retrained members 12 using both designs may be accomplished according to the following method, as shown in FIGS. 14-16. As shown in FIG. 14, attachment device 10 may be placed proximate to frame 14 in an area in which the attachment device may be coupled to the frame. As shown in FIG. 15, fastener 22 may be loosely connected to frame 14 so that body 26 can rotate about axis of rotation 28. Attachment device 10 may be loosely attached to frame 14 by, for instance, rotating fastener 22. Restrained members 12 may be placed in position relative to frame 14 preferably so that at least a portion of edge 62 contacts frame 14 or is positioned proximate to the frame. Body 26 may be rotated so that opening 64 of arm 54 receives edge 62. Once arm 54 grasps edge 62, fastener 22 may be tightened, as shown in FIG. 16. As fastener 22 is being tightened, rotation limiting device 78 is actuated, by bringing outer surface 82 of body 26 in proximity with inner surface 84 of cavity 27. As a result, restrained members 12 cannot be released until fastener 22 is loosened and arm 54 rotated a distance sufficient to release edge 62 from lip 60.

Figure 17:
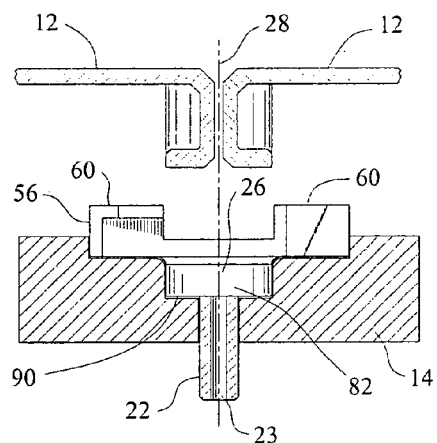
FIG. 17 is a cross-sectional view of the attachment device with arms rotated to an open position and restrained members removed from contact with the attachment device.

As shown in FIG. 17, restrained members 12 may be released from being held by the attachment device 10 by loosening fastener 22 and rotating body 26 to release edges 62 from arms 54. Fastener 22 must be loosened a sufficient amount before rotation limiting device 78 allows body 26 to be rotated.

Figure 18:
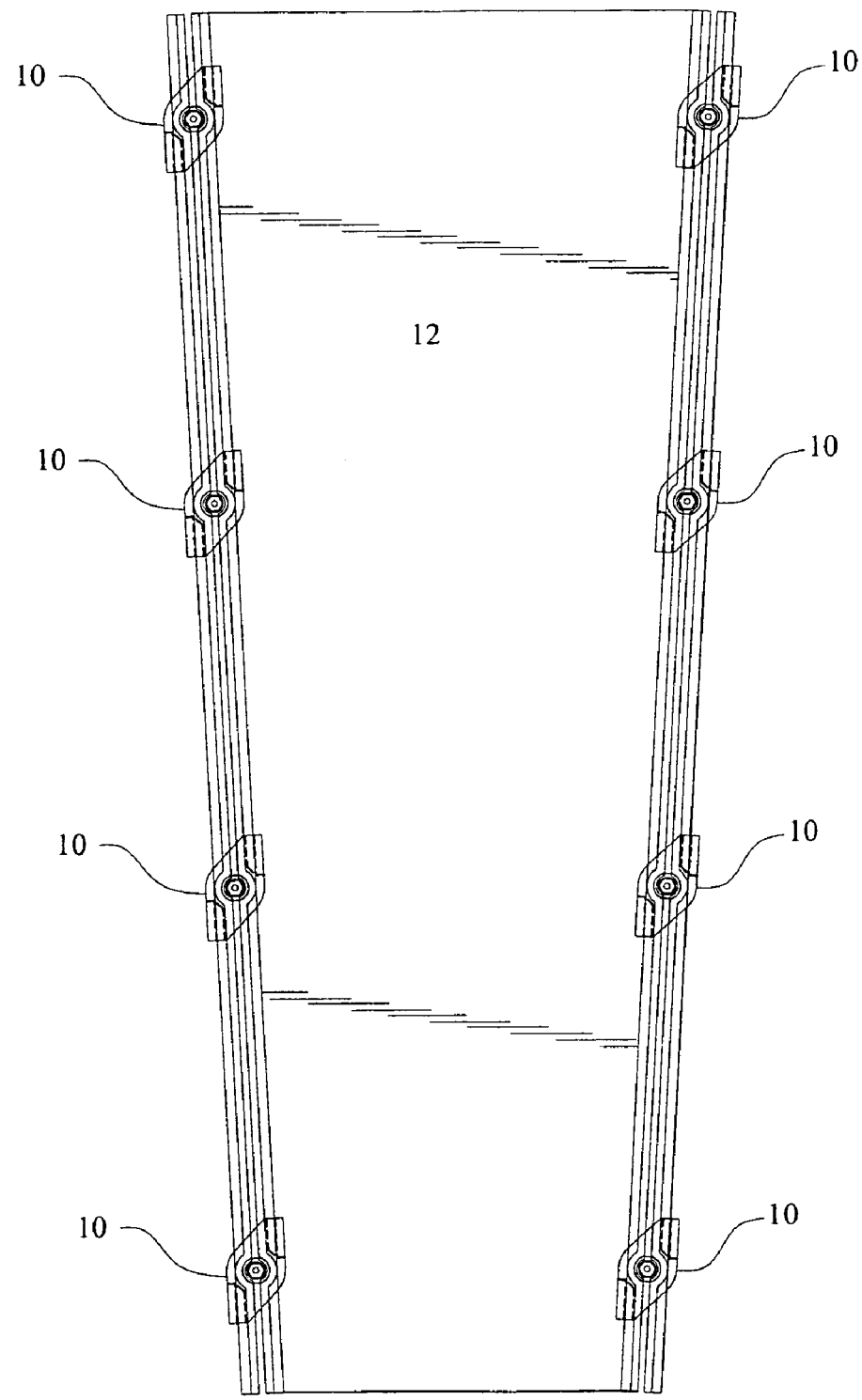
FIG. 18 is top view of a turbine combustor liner coupled to a carrier using a plurality of attachment devices.

FIG. 18 depicts a plurality of attachment devices 10 coupling a liner 12 to a carrier 14. A liner 12 may be held to a carrier 14 using one or more attachment devices 10 and, in at least one embodiment, may use 8 attachment devices 10.

The foregoing is provided for purposes of illustrating, explaining, and describing embodiments of this invention. Modifications and adaptations to these embodiments will be apparent to those skilled in the art and may be made without departing from the scope or spirit of this invention.

We claim:

1. An attachment device, comprising:
   a body rotatable about an axis of rotation and having at least one cavity for receiving at least one fastener;
   the at least one fastener positioned in the at least one cavity and coupled to the body;
   a retainer for preventing the fastener from becoming disengaged from the body; and
   at least one arm extending from the body and configured to grasp an edge of a restrained member after the body has been rotated about the axis of rotation;
   a rotation limiting device for preventing the body of the attachment device from rotating about the axis of rotation after the at least one arm has been placed in contact with a restrained member and the rotation limiting device has been engaged; and
   wherein the rotation limiting device comprises an outer surface of the body configured to prevent rotation of the body about the axis of rotation when the body of the attachment device is placed in a cavity having an inner surface shaped substantially similar to the outer surface of the body.

2. The attachment device of claim 1, wherein the retainer comprises a flange coupled to a bottom portion of the body.

3. The attachment device of claim 2, wherein the flange is threadably coupled to the body and further comprises a welded joint for securing the flange to the body.

4. The attachment device of claim 1, wherein the at least one arm comprises two arms coupled to the body on opposite sides of the body.

5. The attachment device of claim 1, wherein the at least one cavity in the body extends through the body along the axis of rotation.

6. The attachment device of claim 1, further comprising at least one alignment device for receiving an alignment tool to rotate the body, thereby allowing the at least one arm to contact a restrained member.

7. The attachment device of claim 6, wherein the alignment device comprises at least one keyway for receiving a key of an alignment tool.

8. The attachment device of claim 6, wherein the alignment device comprises at least one key for receiving a keyway of an alignment tool.

9. The attachment device of claim 6, further comprising an alignment indicator for indicating a position of the at least one arm.

10. The attachment device of claim 1, wherein the rotation limiting device comprises at least one substantially flat surface forming the outer surface of the body.

11. The attachment device of claim 1, wherein the rotation limiting device comprises a fitting coupled to a bottom surface of the body and having a hexagonal shaped cross-section.

12. The attachment device of claim 1, further comprising an orifice in the fastener extending through the fastener substantially along a longitudinal axis of the fastener for cooling at least a portion of the alignment device.

13. The attachment device of claim 1, further comprising a biasing mechanism for biasing the at least one arm to an open position.

14. The attachment device of claim 13, wherein the biasing mechanism comprises at least one spring positioned proximate to a bottom surface of the body.

15. A liner retainer, comprising:
- a body rotatable about an axis of rotation and having a cavity extending through the body substantially along the axis of rotation;
- at least one fastener positioned in the at least one cavity and coupled to the body;
- a retainer for preventing the fastener from becoming disengaged from the body;
- at least one arm extending from the body and configured to grasp an edge of a turbine combustor liner after the body has been rotated about the axis of rotation;
- a rotation limiting device for preventing the body of the attachment device from rotating about the axis of rotation after the at least one arm has been placed in contact with a restrained member and the rotation limiting device has been engaged;
- at least one alignment device for receiving a tool to rotate the body and contact the at least one arm with a restrained member; and
- wherein the rotation limiting device comprises at least one substantially flat surface on an outer surface of the body configured to prevent rotation of the body about the axis of rotation when the body of the attachment device is placed in a cavity having an inner surface shaped substantially similar to the outer surface of the body.

16. The liner retainer of claim 15, further comprising an orifice in the fastener extending through the fastener substantially along a longitudinal axis of the fastener for cooling at least one outermost surface of the alignment device.

* * * * *